US006535552B1

(12) United States Patent
Pessoa

(10) Patent No.: US 6,535,552 B1
(45) Date of Patent: Mar. 18, 2003

(54) FAST TRAINING OF EQUALIZERS IN DISCRETE MULTI-TONE (DMT) SYSTEMS

(75) Inventor: Lucio Pessoa, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/314,587

(22) Filed: May 19, 1999

(51) Int. Cl.[7] .............................................. H03H 7/30
(52) U.S. Cl. ...................... 375/231; 375/222; 375/348; 370/292
(58) Field of Search ................................. 375/219, 222, 375/231, 232, 233, 346, 348, 350, 377; 370/203, 208, 286, 290, 292

(56) References Cited

U.S. PATENT DOCUMENTS

| | | |
|---|---|---|
| 5,285,474 A | 2/1994 | Chow et al. |
| 5,317,596 A | 5/1994 | Ho et al. |
| 5,461,640 A * | 10/1995 | Gatherer ...................... 375/231 |
| 5,793,801 A * | 8/1998 | Fertner ........................ 375/219 |
| 5,870,432 A * | 2/1999 | Kerckhove .................. 333/166 |
| 6,259,729 B1 * | 7/2001 | Seki ............................ 375/231 |
| 6,289,045 B1 * | 9/2001 | Hasegawa et al. .......... 375/231 |
| 6,389,062 B1 * | 5/2002 | Wu .............................. 375/222 |
| 6,404,806 B1 * | 6/2002 | Ginesi et al. ................ 375/222 |

FOREIGN PATENT DOCUMENTS

EP 0924905 A2 6/1999

OTHER PUBLICATIONS

Strait, "Performance Enhanced Adaptive Equalizers for Multicarrier Channels," IEEE 1997, pp. 750–753.
Pal et al., "A New Method of Channel Shortening With Applications to Discrete Multi Tone (DMT) Systems," IEEE 1998, pp. 763–768.

* cited by examiner

*Primary Examiner*—Young T. Tse

(57) ABSTRACT

A method for fast training of equalizers in a DMT system begins by normalizing the incoming receive signal ($\underline{v}$) via steps (108–116). By normalizing the signal, the convergence rate of the training algorithm becomes relatively independent of channel line length so that long line lengths may converge to optimal equalizer coefficients in short time periods. The method also iteratively adjusts the filter coefficients $\underline{w}$ over time by using an adaptive gain vector $\underline{\mu}$ that is updated on a component-by-component basis on each iteration via steps (114–146). By allowing each component of the vector $\underline{\mu}$ to iteratively adapt independent of all other components in the vector $\underline{\mu}$ based upon the binary sign bit of both real and imaginary components of frequency domain gradient vectors $\underline{G}$, a convergence to optimal equalizer filter coefficients will occur in a short period of time.

34 Claims, 5 Drawing Sheets

US 6,535,552 B1

FAST TRAINING OF EQUALIZERS IN DISCRETE MULTI-TONE (DMT) SYSTEMS

FIELD OF THE INVENTION

The present invention relates generally to fast training of equalizers in DMT systems, and more particularly to multitone (multi-carrier) systems and the fast training of pre-equalizers for high-speed communications over severely distorting and/or severely long channel lines/loops.

BACKGROUND OF THE INVENTION

In the telecommunications industry, information is transmitted over imperfect communication lines such as copper wire, TV cables, fiber optics, twisted pair, and the like. Such transmissions are also made in imperfect conditions and environments. Generally, any and all communication channels, even wireless systems that transmit signals through air, have undesirable parasitic characteristics (e.g., interference, line resistance, line capacitance, signal reflection, etc.) and external influences (e.g., crosstalk from other communication sources). These parasitics and influences result in dispersion of a transmitted signal and the smearing of adjacent data values over one another in the time domain. Such a dispersion phenomenon, referred to as intersymbol interference (ISI), is illustrated in FIG. 1.

FIG. 1 depicts a communication line or communication channel 10. Inside the box representing the channel 10 is depicted a time domain impulse response 12 for a typical channel 10. Specifically, if the channel 10 were subject to a transmitted impulse input $\delta(t)$ of very short time duration (e.g., lasting for a time period of only one sample interval at a given sampling frequency $f_s$) the distorted response 12 would result at the receiving end of the channel 10. Due to the undesired parasitics of the channel 10 and external interference, response 12 is a signal that is spread over v sampling intervals where v is greater than the one sample interval in which the transmit signal $\delta(t)$ was initially contained. In short, response 12 indicates that the energy produced at the end of the channel 10 in response to a short-time duration impulse at time 0 is a smeared and distorted response that spans v sampling intervals. Such dispersion of a signal is common in all communications channels under various conditions. Therefore, FIG. 1 illustrates that if even a single bit of data (a single binary one value) is communicated through the channel 10 from a transmit side to a receive side (using some modulation scheme), that the receive side will receive a widely time dispersed and distorted "image" of that one transmitted binary one value.

FIG. 1 further illustrates the impact the response 12 has on communicated data when transmitting asymmetric digital subscriber line (ADSL) data symbols over the channel 10. In an ADSL system, data is sent in discrete packets containing many frequency-coded digital bits. Each of the frequency-coded packets is transmitted by the transceiver for a time duration of about 250 microseconds whereby each packet is modulated using either 32 carriers (upstream direction, i.e., from remote to central office (CO) side) or 256 carriers (downstream direction, i.e., from central office to remote side). The packets are transmitted serially in time, one after the other, in order to communicate larger blocks of related data, voice, video, sound, or other information between users. Each packet, also referred to as a symbol, is physically sent through the channel using a digital-to-analog converter at the transmit side and retrieved using an analog-to-digital converter at the receive end. Due to the impulse response 12 of FIG. 1, each 250 microsecond transmitted symbols 14a and 16a is distorted and/or smeared at the receiving end over a longer time period of time than the desired 250 microseconds duration. FIG. 1 illustrates the smeared receive symbols 14b and 16b that are provided at the receive end of the channel 10.

In most cases, adjacent smeared symbols 14b and 16b will overlap each other in time thereby causing an intersymbol-interference (ISI) region 18 as shown in FIG. 1. The ISI region is a period of time where data from symbol 14b is distorting data from symbol 16b and vice versa. One solution to the ISI problem is to throw away all ISI-distorted data that lies within the ISI region 18. Another solution is to spread the symbols 14a and 16a farther apart from each other in time by using a larger dormant time period between symbols at the transmit end. By transmitting fewer symbols close to each other, it is possible to eliminate or reduce the size of the ISI region 18 at the receive end. Both of these "solutions" greatly reduce the available data transmission rate and may increase the bit-error rate (BER) of the receive signal. Neither, reduced data rate nor increased BER is desired by the industry.

Furthermore, some channel lines 10 are so adversely subject to parasitics that a single 250 microsecond ADSL symbol may be smeared in time to result in a receive symbol that spans a time duration of more than one symbol. When viewed another way, any one single ADSL symbol at the receive end may be experiencing interference from several other ADSL symbols. To add to the problem of data recovery and integrity, an ADSL channel that transmits 1 unit of initial power at a transmit end will easily attenuate that power to $10^{-6}$ units of power or less by the time the signal reaches the receive end of the channel 10. The combination of ISI and signal attenuation makes ADSL data transmission and recovery complex.

One common way to reduce ISI is to place a hard-wired time domain equalizer (TEQ) 20 serially in-line with the channel 10. Such a TEQ-based system is shown in FIG. 2. The main objective of the time domain equalizer (TEQ) 20 of FIG. 2 is to reduce the channel dispersion and the resulting intersymbol interference (ISI) by shortening the channel impulse response in time (see response 12 of FIG. 1) before discarding data samples. In other words, the channel 10 is initially analyzed to find its impulse response, and the TEQ 20 is then hard-wired to fixed filter coefficients that create a near inverse of this impulse response. With this fixed length channel and fixed TEQ, the combination (convolution) of the channel impulse response and the response of the TEQ 20 nulls out a substantial portion of the ISI whereby only the actual symbol data survives intact from the transmit side to the receive side.

Generally, reduction of ISI is achieved in the prior art by cascading the channel 10 (having an impulse response h with v samples) with a finite impulse response (FIR) filter w of length $N_w$, which is know as the TEQ filter 20, where $N_w$, is a finite positive integer representing a number of data samples. Herein, underlined variable names are used to represent the signals or filter taps in a vector notation. The FIR filter response w is hard-wired, in response to data received by proper signal analysis of the channel 10, such that the combination of h and w has a Target Impulse Response (TIR) 22 shown in FIG. 2. Note that the response 22 is shorter in time than the unfiltered response 12 of FIG. 1 (i.e., the samples v over which the response 12 extends is greater than the number of samples $N_b$ over which the response 22 extends). The desired TIR 20 is an FIR filter b of length $N_b$, where $N_b$ of FIG. 2 is much smaller than the length v of the channel impulse response h of FIG. 1 (where h is a design constraint due to parasitics and external interference). By adding the fixed TEQ 20 in FIG. 2, the adverse ISI of FIG. 2 is contained within a window of $N_b$ samples where $N_b$<<v (see v in FIG. 1) so that less ISI occurs and reduced discarding of data is required in order to effectively transmit the original data 14a and 16a to the receive end.

In discrete multi-tone (DMT) modulation, the ISI will generally occur over the cyclic prefix (CP) portion of the data (which is non-data overhead in the ADSL symbol/packet). Since the CP is non-data overhead in the system, the CP information may be readily discarded over the ISI interval of $N_{cp}$ samples without performance degradation. If $N_b$ is equal or smaller than $N_{cp}$ when taking out the CP portion of the data, ISI of the symbol data is totally eliminated via the system of FIG. 2.

One limiting factor in the fixed TEQ filter approach is that most telecommunications applications do not involve coupling a transmitter or receiver to a fixed length communication channel for all time. In addition, even fixed length communication lines will vary in their impulse response over time due to external interference, thermal changes, etc. Therefore, instead of hardwiring a TEQ 20 to a fixed channel 10, the TEQ 20 of FIG. 2 may be designed to be configurable upon initiation of a training period over the channel 10. Once the fixed-time-period training phase is initiated, the TEQ 20 iteratively adapts the TEQ 20 over time in order to progressively reduce ISI over the fixed time training phase. A block diagram of a common time domain equalization (TEQ) training system that adapts itself during a training cycle is shown in FIG. 3.

In FIG. 3, a known training sequence x is transmitted through the channel IO (or channel h as denoted in FIG. 3) from the transmitter 24. The receiver 26 internally uses the same training sequence to train the TEQ filter w. Generally, the training sequence x is a known signal of finite time duration that is fixed by a specific telecommunications specification (e.g., the specifications for one or more of V.90, V.34, power modems, ADSL, ISDN, etc.) so that the training sequence is easy to implement in a repeatable manner by both the transmitter 24 and the receiver 26. The receiver 26 delays the provision of the training sequence x, via a delay circuit 30, so that the signals r and z within the receiver coincide in time at the inputs to the adder circuit 32. In other words, the delay $\Delta$ that is created by circuit 30 is equal to the physical delay in the channel 10. The target impulse response (TIR) filter 28 is a finite impulse response (FIR) filter b of length $N_b$. The filters w and b are also known as the feedforward and feedback filters, respectively. In operation, the coefficients of the TEQ filter w and TIR b are adaptively adjusted, by a process discussed below, to minimize the mean squared error $|e|^2$, where the output e (error) is shown to the right of FIG. 3. The value e is the difference between the receive-side's internally-used training signal z and the signal r received from the transmitter through the actual channel 10 and the TEQ 20. An error e of near zero means that the ISI has been reduced to $N_b$ samples, which are finally discarded within the receiver 26.

The feedback iterative process used in FIG. 3 to iteratively generate the filter coefficients in TEQ 20 during the training period is referred to as a conventional least mean squares (LMS) approach. The basic objective of the LMS method is to recursively minimize the mean squared error $|e(i)|^2$ using the output data sequence y(i) measured for each frame/symbol and instantaneous gradient estimates. This method, initially disclosed by Chow et al. U.S. Pat. No. 5,285,474, issued on Feb. 8, 1994, and entitled "Method for Equalizing a Multicarrier Signal in a Multicarrier Communication System," has some limitations as discussed below. The prior art LMS method commonly in use today is as follows:

1. Given the training sequence x, obtain the channel output y(1) (signal y at a time 1) and initialize w to some starting values.

2.

| | |
|---|---|
| For i = 1 to $N_1$ | (Loop over the time period of the training phase where $N_1$ is the maximal number of iterations allowed by the finite and fixed training time period) |
| $\underline{Y}(i)=FFT(\underline{y}(i))$, $\underline{X}(i)=FFT(\underline{x}(i))$, $\underline{W}(i) = FFT(\underline{w})$ | (Do fast Fourier transforms on time domain signals $\underline{y}$, $\underline{x}$, and $\underline{w}$) |
| $\underline{B}(i) = \underline{Y}(i) \cdot \underline{W}(i)/\underline{X}(i)$ | (Find $\underline{B}$ from known values of $\underline{Y}$, $\underline{W}$, and $\underline{X}$; for a desired error e = 0, $\underline{B}.\underline{X}=\underline{Y}.\underline{W}$, so that $\underline{B}=\underline{Y}.\underline{W}/\underline{X}$) |
| $\underline{b} = [IFFT(\underline{B}(i))]^+_{Nb}$ | (Find window of IFFT($\underline{B}$) with $N_b$ elements and maximum energy) |
| $\underline{B}(i) = FFT(\underline{b})$ | (Find new $\underline{B}$ using the selected window of $N_b$ samples) |
| Calculate Error: $\underline{E}(i) = \underline{X}(i) \cdot \underline{B}(i) - \underline{Y}(i) \cdot \underline{W}(i)$ | (see adder 32 of FIG. 3) |
| Update $\underline{W}$: $\underline{W}(i+1) = \underline{W}(i) + \mu \underline{E}(i) \cdot \underline{Y}(i)^*$ | (update $\underline{W}$ using the known LMS routine, where $\mu$ is a fixed positive integer and is unchanging over time) |
| $\underline{w} = [IFFT(\underline{W}(i+1))]^+_{Nw}$ | (Find window of IFFT($\underline{W}$) with $N_w$ elements and maximum energy) |
| Next i | (repeat for as long as training period allows or until error is minimized as best as possible within the training time period) |

3. Start transmitting data on the channel with the TEQ active.

The above algorithm usually requires a large number of iterations ($N_i$) in order to converge to an optimal set of TEQ coefficients when used for a typical wireline channel. In addition to being very slow, the LMS algorithm discussed above may end up with a large residual error or misadjustment (which is the difference between the minimum mean square error of the LMS algorithm and the minimum mean square error of the optimum theoretical solution) at the end of the finite training period. This nonoptimal result of the LMS algorithm is due to the fact that the training time period is set by standards and is not a sufficiently long enough period of time to allow a slow LMS method to converge to optimal TEQ coefficients. Since the algorithm indicated above is slow, it does not converge to an optimal TEQ setting in the allotted training time period for most telecommunications standards. Therefore, when using the above method, full data transmission rate is not achieved and the maximal allowable line length may need to be reduced due to the nonoptimal convergence of the prior art LMS algorithm of FIG. 3.

In addition to the above issues, an intrinsic numerical limitation of the above LMS method is the time domain windowing (projection $[.]^+_n$) operation of b and w. In fact, one of the authors of the LMS TEQ training algorithm has disclosed recently that their algorithm could lead to worse performance when increasing the number of iterations. In other words, the prior art LMS algorithm may actually diverge during training operations whereby use of the LMS-corrected TEQ is even worse than if the system had merely left the channel alone and subject to full parasitic effects. See Pal et al., "A New Method of Channel Shortening with Applications to Discrete Multitone (DMT) Systems," Proc. of the IEEE International Conference on Communications, vol. 2, pp. 763–768, June 1998.

Therefore, a new convergence method is needed to more intelligently and effectively reduce or eliminate ISI whereby the algorithm quickly converges to an optimum LMS solution. The algorithm should allow one or more of: (1) more data to be sent per symbol or packet; (2) more reliable and/or simpler data recovery; (3) closer packing of symbols over time to improve transmission rate; (4) improved signal to noise (SJN) ratio; and/or (5) the use of longer channel line lengths. This new method of training a TEQ system should overcome one or more of the major weaknesses the conventional LMS TEQ training algorithm, which are: (1) lack of speedy convergence (or the necessity of longer training times in standards); (2) slower convergence or lack training time period) of convergence for long channel lengths; (3) potential for divergence from an optimal solution; and/or (4) failure to converge to an optimal solution within currently set standard training times whereby present telecommunication performance is degraded.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Generally, FIGS. 4–7 herein teach a fast least mean squares (FLMS) algorithm and apparatus for quickly converging TEQ filter coefficients to optimal or near-optimal settings well within the finite and unadjustable training time periods used for current telecommunication systems. The algorithm taught herein will work for ATM, ADSL, ISDN, V.90, V.34, DSL, optical communication, wireless, power modems, cable modems, or other telecommunication systems that have to deal with line attenuation and/or signal distortion. In addition, the approach taught herein may be readily applied to several other problems that require fast adaptive training/tracking in either time or frequency domain, such as interference canceling, system identification, prediction and inverse modeling, and the like. Generally, the method taught herein obtains its improved convergence rate over prior art techniques by: (1) scaling the receive training signal v according to the channel attenuation to allow for greater adjustment step changes per convergence iterations; and (2) using a step size vector ($\mu$) where each component in the vector $\mu$ is individually and uniquely adjusted each iteration for every carrier/bin in the frequency domain.

This improved algorithm should allow one or more of: (1) more data to be sent per symbol or per unit time; (2) more reliable and/or simpler data recovery methods; (3) closer packing of data symbols on a channel over time to improve bit transmission rate; (4) improved signal to noise (S/N) ratio; and/or (5) the use of longer channel line lengths for reduced infrastructure costs and larger areas of service. Since the FLMS method taught herein is likely to converge much faster than the conventional LMS methods, an optimal TEQ setting is more likely to be obtained in fixed training periods when using FLMS as opposed to existing LMS techniques. Further, the FLMS algorithms of FIGS. 4–7 converge equally fast for long line lengths and for short line lengths, where performance for the more problematic, yet more desirable, long line lengths is enhanced significantly. Generally, all line lengths will benefit equally from the algorithm taught herein, unlike the prior art methods which tend only to benefit shorter line lengths at the expense of the more desirable longer line lengths. Furthermore, the FLMS algorithm herein was never found to diverge under the circumstances that caused divergence in the existing LMS algorithms.

The FLMS algorithm can be better understood with specific reference to FIGS. 4–7 herein.

Figure 4:
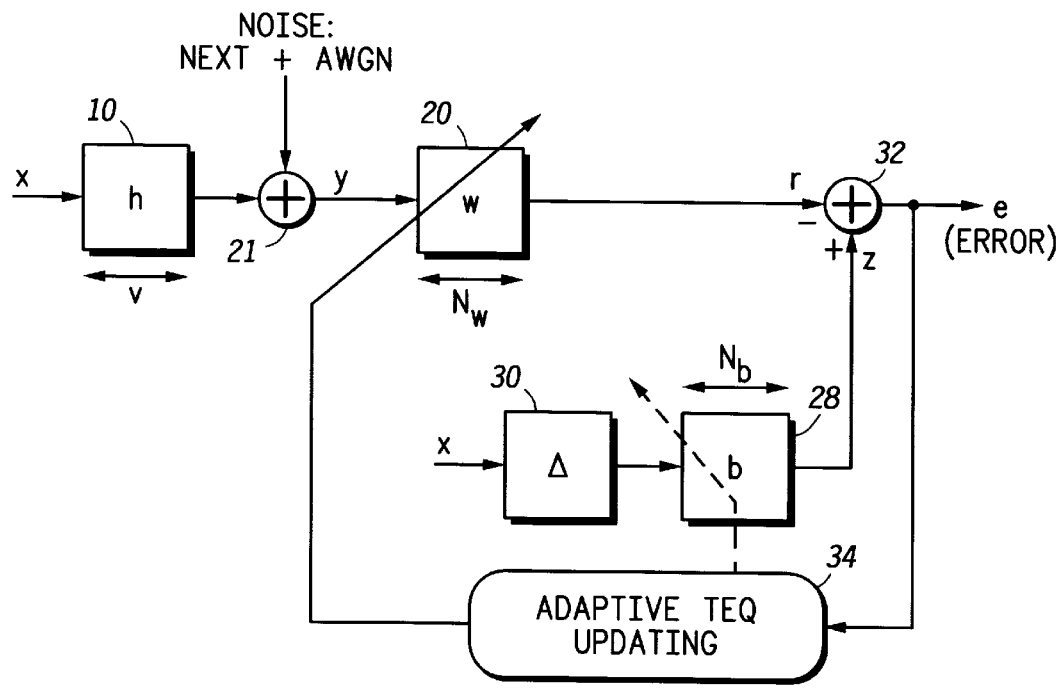
FIG. 4 illustrates, in a block diagram, an adaptive fast least mean squares (FLMS) equalization system, wherein: (1) the TEQ and TIR filters are adaptively adjusted via dynamic gain scalars and/or vectors ($\mu$); and (2) the receive signal y is subject to signal normalization in order to minimize the mean squared error $|e(i)|^2$ at a very fast rate.

FIG. 4 illustrates an adaptive fast LMS (FLMS) system for the fast training of pre-equalizers within a high speed communication infrastructure that utilizes severely distorted and/or severely long channel lines. FIG. 4 illustrates the channel 10 and the training signal x. The channel 10 is a channel line or loop that has parasitics and distortion similar to the channel discussed with respect to FIG. 1. Therefore, intersymbol interference (ISI) needs to be eliminated or reduced in the system of FIG. 4, as was the case in FIG. 1, in order to achieve and acceptable level of performance. Such elimination or reduction of ISI is accomplished in FIG. 4 through the use of a training signal x that is set by some standards body for a particular technology (e.g., V.90, ADSL, etc.). The signal x is provided or generated by the transmitter 24 and sent through the channel 10 while the same signal x is or accessed within the receiver 26 as shown.

FIG. 4 illustrates an adder 21 that couples a noise signal NEXT +AWGN onto the transmitted signal x to create the receive signal y. The adder 21 and its inputs are not physical components of the actual system; instead, this adder and its noise inputs simulate the real-world noise that is typically resident in common communication lines. In other words, adder 21 is not a true component of the system, but is merely present in FIG. 4 to illustrate that a common communication line will inherently involve distortion. Such noise is typically Near-End Cross Talk (NEXT noise) between adjacent communication lines and Additive White Gaussian Noise (AWGN) due to thermal changes in the line over time.

Figure 5:
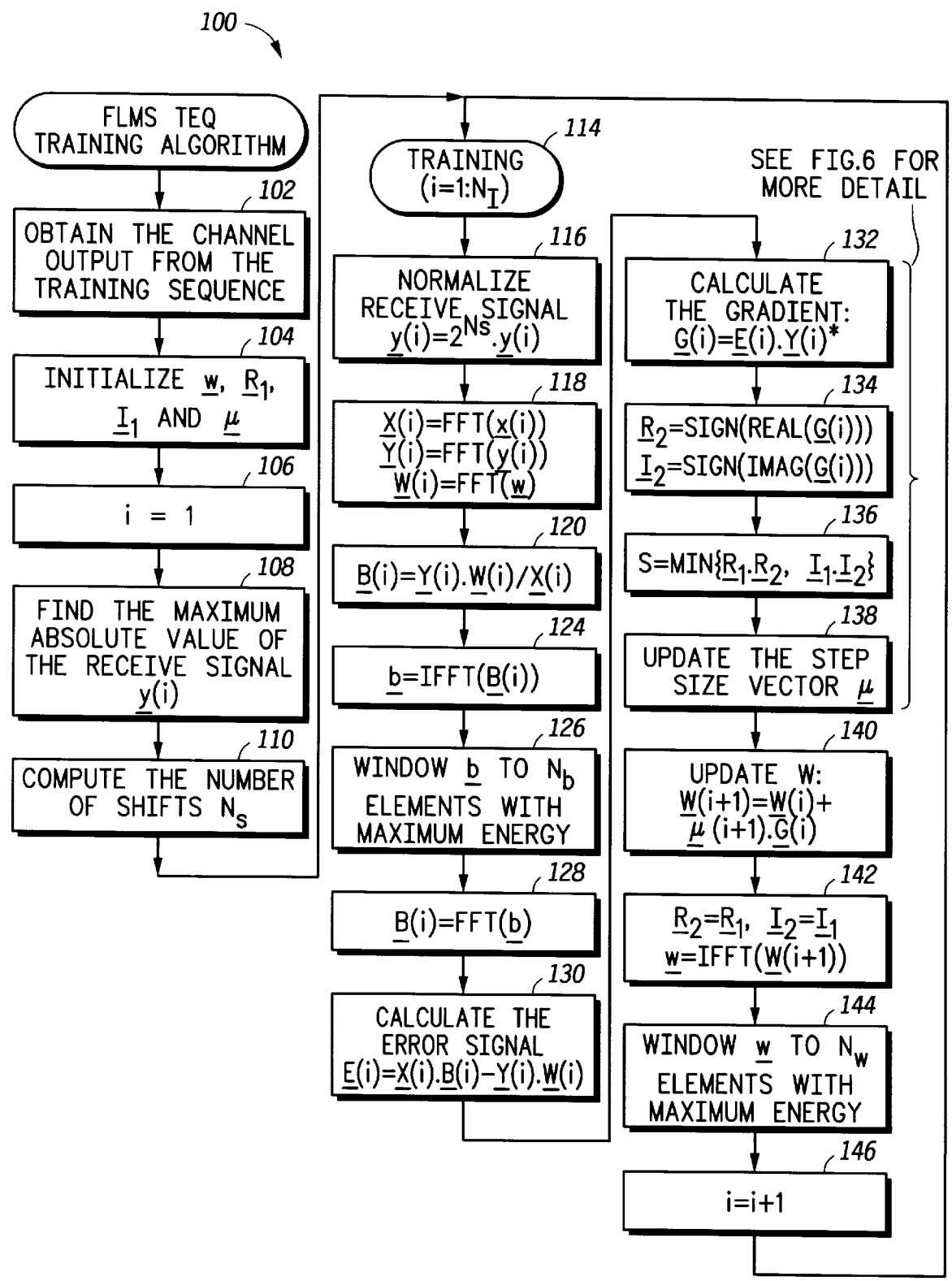
FIG. 5 illustrates, in a flowchart, a method for performing fast LMS (FLMS) equalization in a system similar to the system of FIG. 4.
Figure 6:
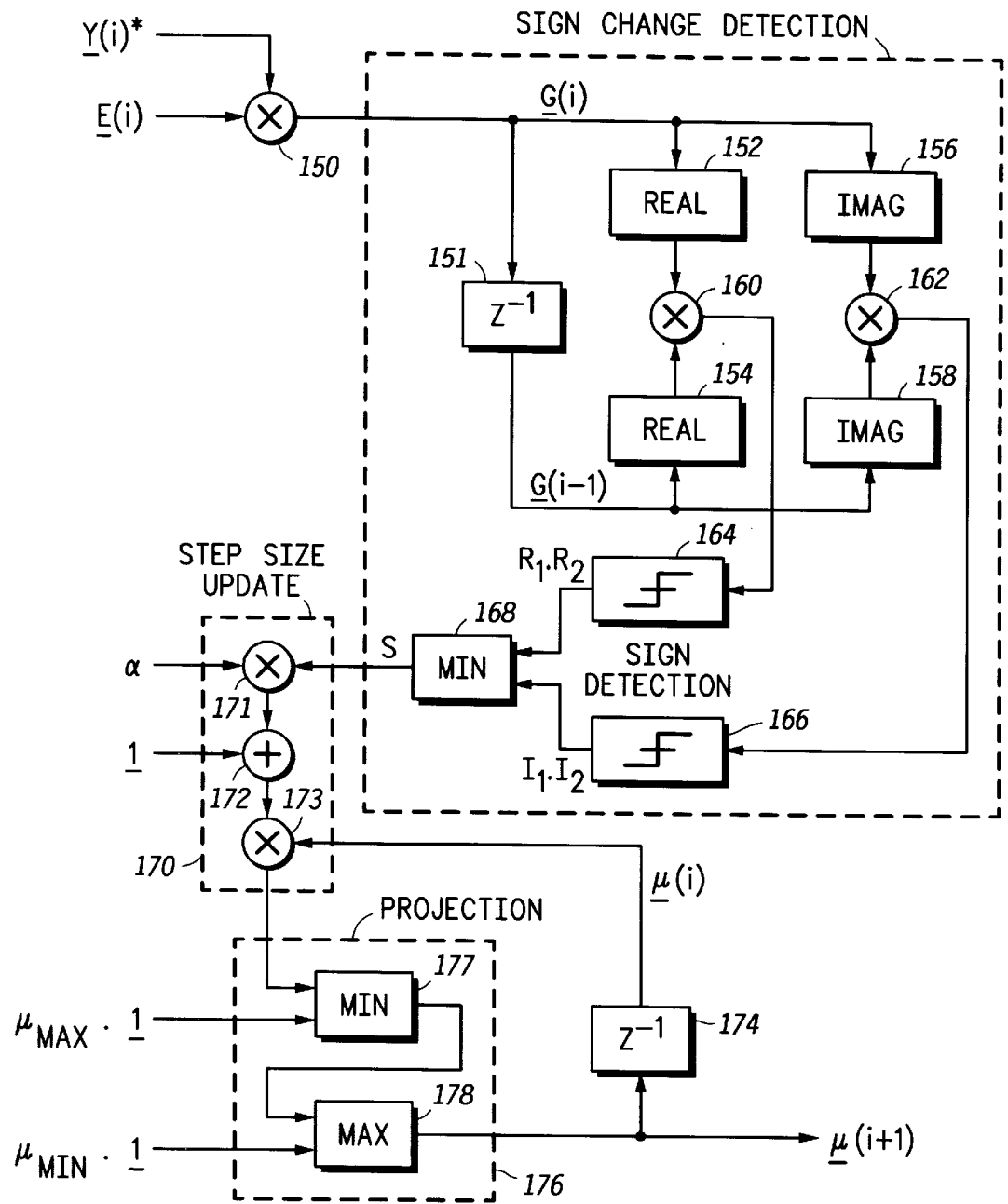
FIG. 6 illustrates, in a block diagram, more details concerning the iterative processing of the step size ($\mu$) vector/scalar introduced in FIG. 5.

The receive signal y is fed to a time equalizer (TEQ) 20 that is trained over time to reduce intersymbol interference (ISI) at a fast rate of convergence due to an adaptive fast LMS TEQ update algorithm 34 (discussed in more detail in FIGS. 5–6). TEQ 20 is adaptively adjusted through the use of normalization of signal v and via iterative application of a dynamic gain vector $\mu$ where each element in the gain vector can be altered/converged independent of all other gain elements in the vector (see the later discussion with respect to FIGS. 5–6).

In addition to the signal x being sent over the channel 10, training signal x is also generated or accessed at the receiver side 26 and placed through a delay circuit 30. The delay $\Delta$ through the delay circuit 30 substantially matches the time delay from the transmit end to the receive end along the channel 10. The target impulse response (TIR) filter 28 is controlled by the FLMS algorithm, which is executed via unit 34, in order to generate a training reference signal z. For the desired case of error e=0 and negligible noise, b (with a proper delay) will equal the convolution h*w whereby r=z so that the output of the adder 32 is zero. To converge on an error e=0, the FLMS algorithm performed by unit 34 iteratively adjusts b and/or w until e=0 or the error is minimized within the alloted standard training time period.

FIG. 5 illustrates the fast least mean squares (FLMS) method 100 that is used to train the filter 20 in order to provide improved filter characteristics over the prior art. In FIG. 5, a step 102 first receives a portion of the training sequence v from the channel 10. The step 102 is also shown in FIG. 4 where y indicates the receive signal that results from transmission of the training sequence x over the channel 10. Software, a microprocessor (CPU or MPU), a microcontroller (MCU), a digital signal processor (DSP), or a like control system within the unit 34 initializes the TEQ filter coefficients w to initial or starting values in a step 104. In addition, the unit 34, via step 104 of FIG. 5, initializes the real and imaginary sign indicators $R_1$ and $I_1$ (which are used as set forth in steps 134–138 in FIG. 5 and FIG. 6). Also, the step 104 initializes the gain scalar $\mu$ (in one embodiment the value $\mu$ is a scalar quantity) or gain vector $\mu$ (in another embodiment the value $\mu$ is a vector) to starting/default values. In step 106, the loop counter i is initialized to 1 or another reasonable starting value.

In step 108 of FIG. 5, the receive signal y is scanned to find the sampled point of the signal y that has the maximum absolute value (i.e., max |y(i)|). Step 110 takes the logarithm base 2 (i.e., $\log_2$) of the max |y(i)| value to determine a binary shift value $N_s$. Shift value $N_s$ is used to determine the number of bit positions by which the incoming data is shifted to the left in order to gain or multiply the signal y to larger magnitude signal. This larger magnitude signal y is referred to as the normalized signal y at the receive end, and it is a signal that is roughly the same strength as the signal that was originally transmitted from transmit end of the channel 10. As an example, a very short channel length may attenuate the transmit signal by roughly 10×. In this short channel case, a left shift of roughly 3–4 bit positions will covert the digital receive signal to a maximum magnitude that is near the maximum magnitude of the original transmitted signal, since a value around $2^3$ or $2^4$ is roughly equal to the decimal attenuation value of 10. Likewise, a longer channel length may attenuate the transmit signal by 500×. In this case, a left shift by roughly 9 bits is needed to adjust the receive signal v to make its maximal gain point near to the maximal gain point of the transmit signal x. In one embodiment, in order to ensure that the signal y is not gained too much and since the max |y(i)| value is based on a sampled point of a continuous signal where the sampled points may miss the true maximal value for the signal y, the left shift value calculated in the step 110 may be decremented by a constant margin (e.g., $N_s=N_s-m$; where m is a finite positive integer roughly between 1 and 5). In another form, the value $N_s$ may be decremented by a percentage (e.g., $N_s=INT(N_s*0.7)$; where INT is the basic integer function that truncates the value at its decimal point with some implemented rounding as needed). In brief, the value $N_s$ found by steps 108–110 is used by step 116 to normalize the signal y to some normalized quantity.

The known prior art did not gain or normalize the signal y to a normalized signal as in step 116 of FIG. 5. Such gain in FIG. 5 has significant benefits. In the ungained or unnormalized prior art, iterative adjustment or adaptations of the filter coefficients were based on the very small signal value y(i), especially for long channel lines or long loop length that has significant attenuation. Therefore, when the prior art adjusted the coefficients w in one iteration by the equation W(i+1)=W(i) +$\mu$E(i).Y(i) *, the y(i) values even multiplied by a large fixed gain value p resulted in a very small adjustment of the parameters on each iteration. If the algorithm was a long way from converging, these minor steps each iteration were in no way going to adequately converge to optimal filter coefficients in the allotted standard training period. Therefore, especially for long channels, too many iterations are needed in prior art LMS routines in order to converge the filter coefficients to an optimal setting. Because of this slow convergence, the training time period would usually terminate before the algorithm of FIG. 3 could find an adequate set of filter coefficient values whereby ISI could not be effectively reduced in the system.

In essence, the prior art LMS algorithm failed to converge to optimal filter coefficients when such conversion was most needed, since longer communication lines generally suffer more from parasitic distortion than shorter lines. If prior art LMS techniques were to compensate for the small y(i) values by increasing $\mu$ to a large numerical value, the convergence of filter coefficients for a long channel line is improved. However, when the same modem having the large fixed $\mu$ value is then coupled to a short channel length connection, the large $\mu$ value along with the larger y(i) values within the product $\mu$ E(i).Y(i) * will cause lack of optimal convergence or even divergence in some cases. This means that a short channel length may be made no better off by the prior art algorithm compensated for long channels. In a worse case, the system that occasionally uses short loops/channels may be made worse off by the use of the training procedure that overcompensates the prior art LMS techniques for long channels.

The above difficulties of the prior art are avoided through use of the normalization values of y derived via steps 108–116 of FIG. 5. When normalizing the signal to a normalized power value roughly equal or slightly less than its transmitted power in step 116, the signal y that is used in all subsequent calculations is rendered uniform and independent of channel length for all channel lengths. Therefore, filter coefficients for any channel length will converge with equal speed and optimal effect. In addition, divergence can be wholly avoided in areas where divergence will occur in the prior art since overcompensation of the prior art's fixed value of $\mu$ is not needed in any application.

After initializing computer variables and finding the normalization or shift value $N_s$, the iterative filter coefficient training algorithm is performed by steps 114–146. First, a looping construct from 1 to $N_1$ is initiated in a step 114 in order to perform iterative convergence of the filter coefficients w. The receive signal y, as discussed above, is normalized in step 116 by performing a left shift on the incoming digital signal y by $N_s$ bit positions. In a step 118, the receiver performs fast Fourier transforms (FFTs) on the time domain signals of x, y (as normalized by step 116), and w to the frequency domain, where the frequency domain is represented by capitol reference letters (e.g., X, Y, and W. The filter parameters B associated with the filter 28 of FIG. 4 are updated assuming that error E=0=B. X−Y. W (see the adder 32 of FIG. 4). Given this relationship of B. X−Y. W=0B=Y. W/X as indicated in step 120 (multiplications and divisions are done on a component-by-component basis) B can be interatively adpated in step 120.

After finding the values of B for E=0 in step 120, the step 124 performs an inverse fast Fourier transform (IFFT) to arrive at the time domain values of b. The components of b are likely to spread over a wide range of time. Step 126 is used to scan the wide range of time spanned by the signal b in order to find the time window within b that contains $N_b$ sample points where these $N_b$ sample points of signal b contain the maximal energy over all other $N_b$ sized windows within b. This window of maximal overall power, having $N_b$ data elements from the larger domain of b and absent all data outside that window, is then FFT processed back to a frequency domain B as shown via step 128. After the FFT step 128, the error E(i) is calculated using the normalized Y value, the X value, the windowed B value from step 128, and the existing W value (see adder 32 of FIG. 4).

Step 132 of FIG. 5 is then used to find a gradient vector G, which is the vector E multiplied by the complex conjugate of Y (represented as Y(i) *). This multiplication of the vector E and vector Y* is performed on a component-by-component basis to result in the vector G which also has several components. Although it is not indicated in FIG. 5, the gradient vector G may also be scaled up (by some appropriate left shift) if speed of convergence is very critical (especially for long lines/loops). The real and imaginary portion of each component within the vector G is analyzed in step 134. In step 134 the sign of each current or most-recent real component in vector G and the sign of each current or most-recent imaginary component in vector G is found. The current (i.e., most-recent or new signs) are designated as $R_2$ and $I_2$ in FIGS. 5–6. The old signs from one or more previous iterations of steps 114–146 are also stored by the system where the old signs (or default signs on the first iteration or first few iterations) are referred to as $R_1$ and $I_1$, in FIGS. 5–6. In step 136, the current and old signs of $I_1$, $I_2$, $R_2$ and −1, where each are either −1 or 1, are known. In this step 136, the minimum of the two products $I_1$. $I_2$ and $R_1$. $R_2$ are found. If some component of either $I_1$. $I_2$ or $R_1$. $R_2$ is −1, then the corresponding component of S will be −1 in step 136. If some component of both $I_1$. $I_2$ and $R_1$. $R_2$ is 1, then the corresponding component of S will be 1 in step 136.

In step 138, each component in the gain vector $\mu$ is updated by multiplying the sign vector S from step 136 with a rate of change $\alpha$ of the gain vector and adding to the result the constant vector, illustrated as 1 in FIG. 5. The process of steps 132–138 will be explained in more detail with respect to FIG. 6. The result of step 138 in FIG. 5 is that each component of the vector $\mu$ is incremented or decremented on its own initiative to converge the various components of the value W at its own optimal rate in a very efficient manner.

As a simple example, with starting values of 0.5 for all of three $\mu$ components, a rate of change step size $\alpha=0.05$, and an additive constant of 1 as in FIGS. 5–6, progress of the three component vector $\mu$ may be as follows:

$\mu_1$: 0.50->0.53->0.55->0.58 . . .

$\mu_2$: 0.50->0.48->0.45->0.43 . . .

$\mu_3$: 0.50->0.53->0.50->0.52 . . .

After adjustment of the vector $\mu$ in step 138 (see FIG. 6 for more details), the new value of $\mu$ is used in a step 140 to update the filter coefficients W for filter 20 (see FIG. 4) on a component-by-component basis. After the iterative modification of the W components in step 138, the new sign values $R_2$ and $I_2$ are set to the old sign values $R_1$ and if for the next iteration in step 142. In addition, similarly to the computation of b, the frequency domain vector W is converted back to a time domain sequence w via a step 142. In a step 144, a finite window of $N_w$ elements of the sequence w is identified where this window of $N_w$ elements has a maximal energy over all other windows of size $N_w$ within the sequence w. This window w of $N_w$ elements is used as the next w value for the next iteration of the steps 114–146 until the loop variable of i=$N_1$ is attained or until convergence can be improved no longer.

Therefore, the new FLMS technique may be summarized as follows:

FLMS TEQ Training Algorithm

1. Given the training sequence, obtain the channel output y(1) and initialize w, $R_1=I_1=0$ $\mu(1)=\mu_0.1$.
2. Find the maximum absolute value $M_y$ of the receive signal y(1) and compute $N_s=|Fix(\log_2(M_y))|-m$, where m is an integer margin selected according to the specific architecture being used.
3. For i=1 to $N_1$ Normalize y(i): $y(i)=2^{Ns}.\ y(i)$ $X(i)=FFT(x(i))$, $Y(i)=FFT(y(i))$, $W(i)=FFT(w)$ $B(i)=Y(i).\ W(i)\ /X(i)$ $b=[IFFT(B(i))]^+_{Nb}$=Window with $N_b$ elements and maximum energy $B(i)=FFT(b)$ Calculate Error: $E(i)=X(i).\ B(i)-Y(i).\ W(i)$ $G(i)=E(i).\ Y(i)^*$ $R_2$=Sign[Real $(G(i))$], $I_2$=Sign[$Imag\ (G(i))$]

S=Min{$R_1$. $R_2$, $I_1$. $I_2$}

Update $\mu$:$\mu(i+1)=[(1+\alpha).\ S).\ (i)]^+$=Max{Min{$(1+\alpha.\ S).\ \mu)(i)$, $\mu_{max}.1$}, $\mu_{min}.$

1}

Update W: $W(i+1)=W(i)+\mu(i+1).\ G(i)$ $R_1=R_2$, $I_1=I_2$ $w=[IFFT(W(i+1))]^+_{Nw}$=Window with $N_w$ elements and maximum energy Next i In the detailed FLMS algorithm above, Fix(t) denotes the rounding of t to the nearest integer towards zero. The actual calculation of $N_s$ is efficiently performed by Digital Signal Processors (DSPs) with fractional data representation, such as the Motorola DSP56300 family, by counting the number of leading zero bits before a 1 is obtained and then subtracting the margin m. For those DSPs, scaling the receive signal y(i) can be a required operation due to the limited dynamic range of the numbers that can be represented in their arithmetic logic units. Finally, all the vector multiplications in time or frequency domain consist of parallel (component-by-component) multiplications, which are also performed very efficiently in most DSP architectures. Similarly, all the Min/Max blocks in the pseudocode above correspond to parallel operations that may be easily performed in modem DSP engines. Therefore, the algorithm taught herein can be performed vary efficiently in many commercially available DSP engines.

Using in place computation and spectral Hermitian symmetry, the required additional complexity per iteration of the FLMS algorithm is:

3N+1 multiplications/shifts to scale the receive signal and update step sizes.

2(N+1) comparisons to make sure the step sizes are within acceptable bounds (projection operation [.]$^+$).

3N+1 memory locations to store the gradient estimate (real and imaginary parts) and step sizes.

Such minor increase in computational overhead was deemed acceptable in order to obtain the advantages associated with the accurate and quick convergence of the FLMS algorithm.

FIG. 6 illustrates, in more detail, the process performed by the steps 132–138 of FIG. 5. In the software and/or hardware diagram of FIG. 6, the complex conjugate of the normalized FFT receive signal Y (shown as Y(i) *) and the error signal E as calculated in step 130 of FIG. 5 is provided to a multiplier unit or multiplier routine 150. The values Y* and E are multiplied together by the multiplier 150 in FIG. 6 to form a gradient G (this step is also illustrated in step 132 of FIG. 5). The gradient G(i) that is output from unit 150 is the new gradient or most-recent gradient associated with the current iteration. In addition to the new gradient, old gradient(s) from one or more previous iterations (generally it is just one gradient quantity from the immediately preceding iteration) is also stored in computer readable memory as G(i−1) in FIG. 6. In other words, the unit 151 of FIG. 6 is a storage unit that stores one or more old gradient values (where FIG. 6 specifically illustrates only one old gradient from the immediately preceding iteration G(i−1)) from one or more previous computations. For the particular specification of FIG. 6, if the implementation is done using a general-purpose DSP, the same block of memory may be used to store both G(i−1) and G(i), whereby the old components of G from past iteration(s) are sequentially replaced by the newer components using in place computation.

After the unit 150 calculates the gradient G(i), both the new gradient G(i) and the old gradient G(i−1) are separated into their real and imaginary mathematical components via computational or memory units 152, 154, 156, and 158. The old and new real components (R) and the old and new imaginary components (I) are respectively multiplied together via multiplication functions or multiplication units 160 and 162. The multiplication units 150, 160, and 162 may be many different dedicated multiplication units and/or functions or may be one multiplication unit or one function that is time shared between all the multiplication functions 150, 160, 162, as well as being used for other multiplication functions shown in FIG. 6. As an example of the operation of multiplier 160 during an iteration, if only one of the real components out of units 152 and 154 was negative and the other positive, then the product result out of unit 160 would be negative. If both the values from the units 152 and 154 were either negative or positive, then the output of the unit 160 would be positive. The multiplied values from units 160 and 162 are then provided separately to sign detection units or routines 164 and 166. The two output values from units 164 and 166 are one of either 1 or −1 and are passed into a minimum detection unit 168, whereby the units 164–168 perform the operation shown in step 136 of FIG. 5. The units 152, 164, 156 and 166 of FIG. 6 are implicitly performing the step 134 shown in FIG. 5 (note that the sign of a multiplication is equal to the multiplication of the signs).

In FIG. 6 and after S is output by the unit 168 in FIG. 6, the value of S and one or more old step size scalars or vectors $\mu$(depending upon the embodiment used) is provided into a step size update unit or routine 170. In the unit 170, every component of S (which is either 1 or −1) is multiplied, via a multiplier 171, by a rate of change a of the gain vector. The value of a may be viewed as a correction factor. Generally, α is a small quantity between 0 and 1 and is selected differently by the circuit designer and/or user depending upon the application and convergence rate desired. After the a multiplication operation by the unit 171, an adder unit or routine 172 is used to add an integer constant, such as a vector 1, to the output of the multiplier 171. After adding the constant vector 1 via the adder 172, another multiplier 173 takes the output of the adder 172 and one or more older stored values of the scalar or vector $\mu$ from a storage unit 174 and performs another multiplication or mathematical operation.

The component-by-component vector output or scalar output of the multiplier 173, which is the new $\mu$ component that is used during the next iterative computation, is provided to a floor and ceiling limiter unit 176 (projection stage). The limiter portion 177 within unit 176 compares the new $\mu$ value to an upper limit in a component-by-component manner, vector manner, or scalar manner (depending upon the embodiment) and limits the quantity $\mu$ to an upper limit based upon $\mu_{max}$ if an upper threshold limit is exceeded. In a similar manner, the limiter portion 178 of unit 176 compares the new $\mu$ value to a lower limit in a component-by-component manner, vector manner, or scalar manner (depending upon the embodiment) and limits the quantity $\mu$ to an lower limit based upon $\mu_{min}$ if the lower threshold is exceeded. The output of the limiter 176, which is the final new $\mu$ value, is used in the next iteration and is stored in the old storage unit 174 for usage in one or more subsequent iterations as discussed with respect to FIG. 5. If a vector step size is not needed or cannot be implemented due to computational limitations, the vector $\mu$ can be converted into a scalar in many different ways; e.g., the sign vector S can be converted to a scalar by taking the average of its components, and used to update a scalar step size via the unit 170 in FIG. 6 (the unit vector I becomes a single scalar). The use of a vector gain $\mu$ was a preferred embodiment for TEQ adaptive design because the eigenvalue spread associated with the LMS update is quite large for most communication channels used in practice. Therefore, FIG. 6 illustrates in more detail the specific manner by which the quantity $\mu$ is dynamically altered in each iteration.

Figure 1:
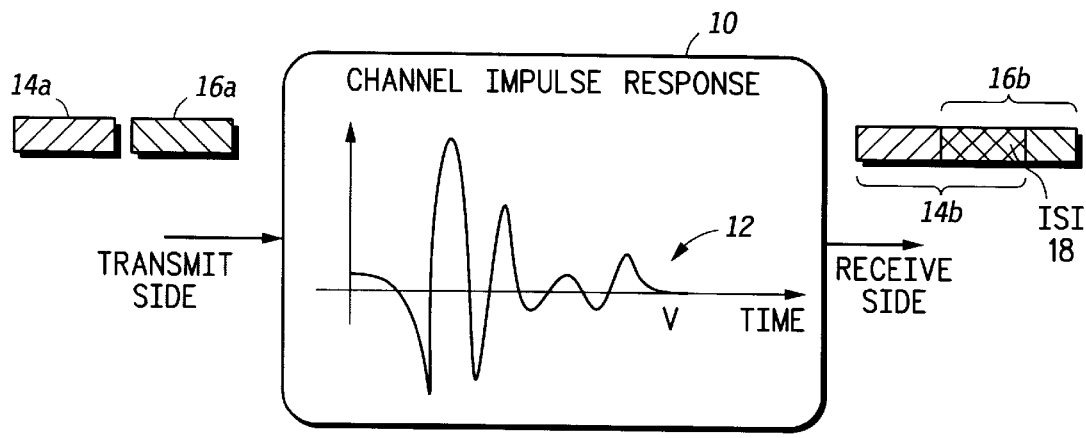
FIG. 1 illustrates, in a block diagram, the prior art problem of intersymbol interference (ISI) that results due to inherent channel dispersion, interference, distortion, and/or line parasitics.
Figure 2:
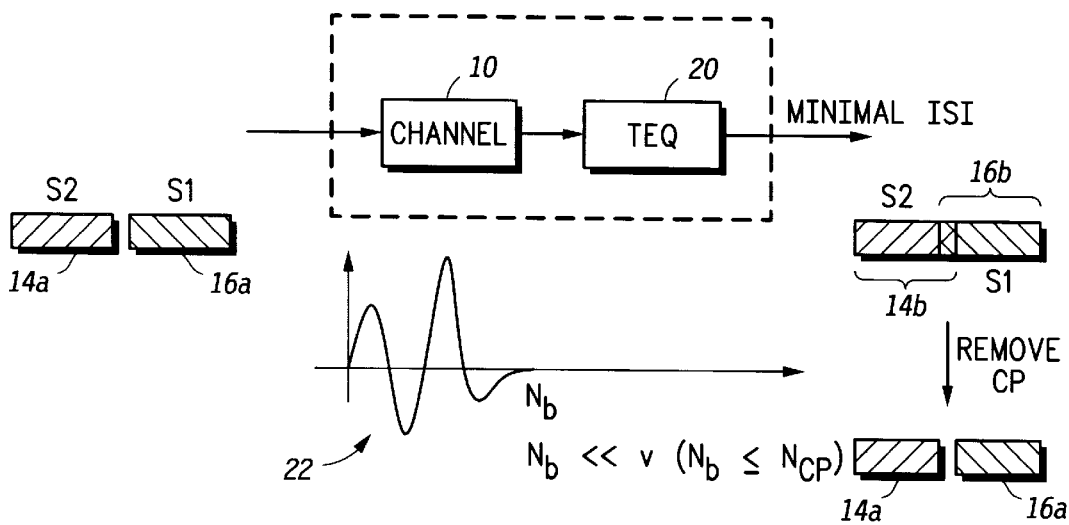
FIG. 2 illustrates, in a block diagram, the prior art combination of an imperfect channel with a hard-wired TEQ circuit which together is intended to generate an overall channel response (target impulse response) that is improved over the channel response that results when no TEQ is used as in FIG. 1.
Figure 3:
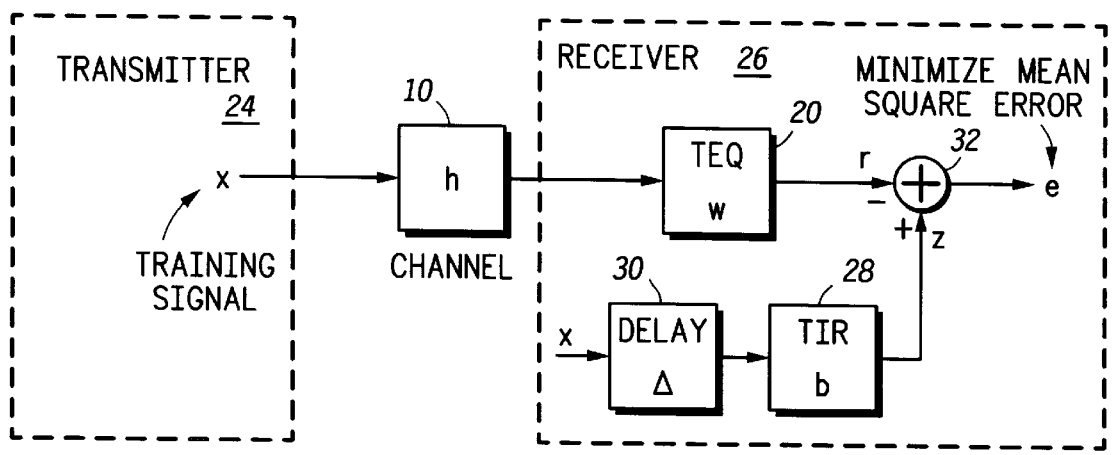
FIG. 3 illustrates, in a block diagram, a prior art TEQ training procedure where the combination of the original channel and TEQ is iteratively processed to slowly converge TEQ filter coefficients toward an optimal setting.
Figure 7:
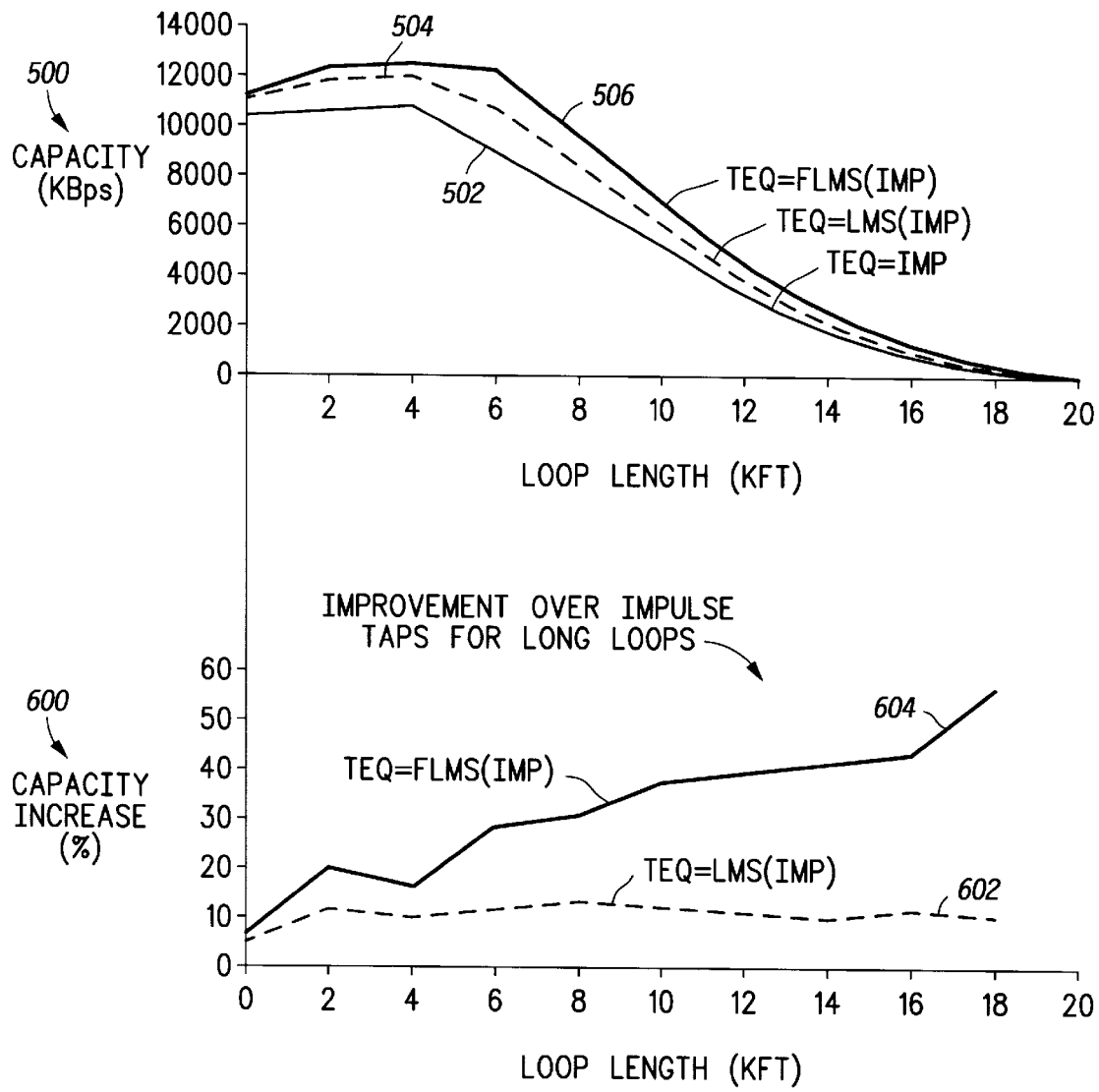
FIG. 7 illustrates, in an X–Y plot, a typical line transmission improvement that is experienced when using the new method of FIGS. 4–6 versus the best prior art method of FIG. 3 in an existing digital subscriber line (DSL) transceiver.

FIG. 7 illustrates an advantage of using the technique outlined in FIGS. 4–6 versus the prior art solution discussed with respect to one or more of FIGS. 1–3. A top portion of FIG. 7 illustrates a first X–Y graph 500. In graph 500, the X-axis represents channel line length or loop length for an ADSL system, and the Y axis represents the downstream bit capacity (in kilobits per second—Kbps) communicated over a given line length. In plot 500, various different line lengths of identical copper line under identical environments were tested using no time domain equalizer techniques (referred to as an impulse or IMP configuration), the known least mean squares (LMS) techniques, and the fast LMS (FLMS) technique taught herein. The no filter technique provides communication bit rates as a function of line length as is shown via the curve 502 of FIG. 7. A best case LMS technique (one that does not diverge as discussed above in the Background) may improve upon the bit capacity of curve 502 by about 5–10% as is shown by the LMS curve 504 in FIG. 7. However, as shown via curve 506 of FIG. 7, the bit communication rate for all possible line lengths can be improved even more than prior art LMS techniques by using the FLMS technique.

Graph 600 of FIG. 7 compares the percentage increase in downstream bit capacity as a function of line length for the prior art LMS technique and new FLMS technique discussed herein. The best LMS results generally improve upon the channel's bit rate by roughly 10% over a same line that uses no TEQ processing. Note that the 10% improvement that a prior art LMS technique offers over a no-TEQ system is relatively independent of line length (see curve 602). In other words, the prior art LMS techniques do not perform better on the more problematic long line lengths than on the simpler less-parasitic-affected short line lengths. However, the FLMS technique is able to improve upon the prior art LMS technique at all line lengths. Furthermore, the FLMS technique proved over 40% more effective at increasing bit capacity per line at long line lengths on the order of 15Kft to 20Kft. This improvement that occurs when using FLMS is due in part to the fact that the receive signal (y) normalization and dynamic adjustment of the gain scalar or gain vector $\mu$ allows the FLMS technique to further optimize the TEQ filter in the fixed training cycle time period beyond that possible when using the slower-converging LMS technique. The normalization of the signal y during training ensures that longer channel lines are better optimized by removing the severe line attenuation associated with long line lengths in the calculations of steps 130, 132 and 140 of FIG. 5. This attenuation in the LMS algorithm reduces the algorithm's ability to converge at an adequate speed, and such a problem was mitigated or totally avoided in the FLMS technique taught herein.

Therefore, the FLMS method taught herein more intelligently and effectively reduces or eliminates intersymbol interference (ISI). FLMS techniques converge on an optimum LMS solution whereas prior art LMS techniques fail to completely converge within training time periods or even diverge in some circumstances. The FLMS has one or more other advantages. For example, more data may be sent per symbol when using the FLMS approach as shown in FIG. 7 herein. Since the FLMS algorithm reduces ISI interference better than most other algorithms, a more reliable and/or simpler data recovery algorithm may be employed (less DSP MIPS may be needed to acquire the same unit of data due to faster convergence). In addition, as line transmission rates become faster, the FLMS technique may allow closer packing of data symbols over time to improve transmission rate in addition to the above-mentioned improvement of bit density per symbol. It may be possible to simultaneously improve signal to noise (S/N) ratio and/or deploy a system with longer channel line lengths whereby more residential area may receive the benefits of higher speed communication at a lower cost (i.e., reduced number of repeaters or base units are needed).

Another advantage is that the FLMS systems and algorithms taught herein can be used in many different applications. The time domain equalizer (TEQ) that is used in modern communications systems is the primary application discussed herein. The FLMS TEQ training algorithm has been implemented and tested using the Motorola 56300 DSP in an existing digital subscriber line (DSL) system and has shown significant improvements over the previous LMS method (see FIG. 7). Even though the added number of processing steps of the new method may impose a reduction in the available number of iterations for TEQ training on some DSP architectures, the final results after training usually generate significantly better performance in terms of ISI reduction for both downstream and upstream connections. The advantage was especially pronounced for long loops (see FIG. 7). This is important since telecommunication companies have continued to demand longer line/loop lengths in order to reduce system infrastructure costs (e.g., reduce the number of repeaters or base stations needed) and/or increase the size of a customer service area per base unit.

The FLMS method and structure taught herein may be used in frequency domain equalizer applications. The frequency domain equalizer (FEQ) is generally a critical application in discrete multitone (DMT) systems. Once the optimal TEQ filter is designed or trained, the equivalent channel impulse response of the receive path must be equalized before the transmit data can be decoded by the receiver. If H is the frequency domain representation of the receive path channel impulse response (including TEQ), the typical selection of FEQ is simply E=1/H. On the other hand, after the system is in regular operation (in "show time"), the DMT transceiver must track variations of the channel over time. Usually, the FEQ taps are adapted via the FLMS algorithm in a manner similar to the FLMS TEQ training taught herein. Scaling the receive signal y and using an adaptive step size vector $\mu$ improves the frequency domain equalization performance because the training process will be independent of the loop length, present optimal convergence rates for every carrier/bin, and/or improved numerical stability of the system (e.g., smaller residual error).

The FLMS routines and/or hardware may also be used in frequency domain echo canceller (FREC) circuitry and/or like software methods. The frequency domain echo canceller (FREC) is an important application for DMT transceivers that implement spectral overlap. Spectal overlap is when a downstream and upstream signal from a tranceiver is communicated over an overlapping frequency band. Spectal overlap is desired since it reduces the maximal frequency of the communication system whereby even longer line lengths can be supported. The reduction in the maximal frequency communicated on the line allows longer line lengths since the parastitics of the channel are usually a direct function of frequency (i.e., the higher the frequency, the worse the parasitics). In FREC, the idea is to explore the frequency and time domain of the DMT data and design a frequency domain update of the adaptive FREC filter coefficients. An efficient method for FREC adaptive design was disclosed by Ho et al. U.S. Pat. No. 5,317,596, issued on May 31, 1994, and entitled "Method and Apparatus for Echo Cancellation with Discrete Multitone Modulation." Similarly, the actual update of the FREC filter coefficients may be based on the FLMS algorithm with a similar structure of the FLMS TEQ training taught herein. Using an adaptive step size scalar or vector $\mu$ improves the echo cancellation performance because the training process will present optimal convergence rates for every carrier/bin and/or provide improved numerical stability. Therefore, there are many practical applications for the FLMS algorithms taught herein.

Although the present invention has been described with reference to a specific embodiment, further modifications and improvements will occur to those skilled in the art. It is to be understood, therefore, that the invention encompasses all such modifications that do not depart from the spirit and scope of the invention as defined in the appended claims.

What is claimed is:

1. A method for training a receiver, the method comprising the steps of:
   receiving a receive signal;
   finding a value of the receive signal over a specific period of time;
   normalizing the receive signal to a normalized receive signal using the value derived from the receive signal;
   determining a vector related to the normalized receive signal;
   determining an adaptive gain value from a current value and a previous value of the vector related to the normalized receive signal; and
   using the adpative gain value and the vector related to the normalized receive signal to generate a set of adaptive filter coefficients for use by the receiver when receiving subsequent data.

2. The method of claim 1, wherein the receive signal includes transmitted data elements transmitted via a communication channel coupled to the receiver, and wherein the set of adaptive filter coefficients is used to compensate for parasitics within the communication channel to reduce time domain interference between transmitted data elements.

3. The method of claim 1 wherein the set of adaptive filter coefficients is used to reduce an echo of a transmit signal received by the receiver when receiveing the subsequent data.

4. The method of claim 1 wherein the set of adaptive filter coefficients is used to compensate for channel gain and phase distortion of a communication channel.

5. The method of claim 1 wherein the step of using comprises:
   using a fast least mean square (FLMS) method to generate the set of adaptive filter coefficients for use by the receiver.

6. The method of claim 1 wherein the step of finding comprises:
   scanning the receive signal over time to find a maximal absolute value of the receive signal as the value.

7. The method of claim 1 wherein the step of normalizing comprises:
   calculating $\log_2$ of the value of the receive signal to obtain a first shift value; and
   shifting digitized values of the receive signal by a second shift value that is a function of the first shift value to result in the normalized receive signal.

8. The method of claim 7 wherein the step of calculating is done by counting the number of leading zero bits before a 1 is obtained in the value of the receive signal.

9. The method of claim 7 wherein the second shift value is equal to the first shift value minus a margin value.

10. The method of claim 1 wherein the set of adaptive filter coefficients is used to reduce intersymbol intererence (ISI) between consequetive data values.

11. The method of claim 1 wherein the set of adaptive filter coefficients is used to reduce intersymbol interference (ISI) for asymmetric digital subscriber line (ADSL) data symbols.

12. The method of claim 1 wherein the set of adaptive filter coefficients is used for time or frequency domain equalization of ADSL data.

13. The method of claim 1 wherein the set of adaptive filter coefficients is used for time or frequency domain equalization of analog modem data.

14. The method of claim 1 wherein the set of adaptive filter coefficients is used for time or frequency domain equalization of information trasmitted by a wireless device.

15. The method of claim 1 wherein the set of adaptive filter coefficients is used for time or frequency domain equalization of information trasmitted by a cable modem.

16. The method of claim 1 wherein the set of adaptive filter coefficients is used for time or frequency domain equalization of information trasmitted by a local wireline system.

17. The method of claim 1 wherein the step of using the normalized receive signal comprises:
   Changing the adaptive filter coefficients $\underline{W}$ by iteratively updating the filter coefficients by the relationship:

$$\underline{W}_{new} = \underline{W}_{old} + \underline{\mu} \cdot \underline{G}$$

where $W_{new}$ represents new adaptive filter coefficients, $W_{old}$ represents previously calculated adaptive filter coefficients, $\underline{\mu}$ represents a gain value, and $\underline{G}$ is a vector related to the normalized receive signal $\underline{Y}$.

18. The method of claim 17 wherein the gain value $\underline{\mu}$ is either a scalar value that changes with each iteration or a vector wherein each component of the vector changes independent of other components in the vector with each iteration.

19. The method of claim 17 wherein the value $\underline{G}$ is the multiplication of a complex conjugate of the receive signal ($\underline{Y}^*$) by an error quantity ($\underline{E}$).

20. The method of claim 19 wherein the gain value $\underline{\mu}$ is updated by using the real and imaginary components of $\underline{G}$.

21. The method of claim 20 wherein the sign of both the real and imaginary components of $\underline{G}$ and an older value of $\underline{G}$ from a previous iteration is used to update the gain value $\underline{\mu}$.

22. The method of claim 21 wherein a quantity $\underline{S}=\text{MIN}\{\underline{I}_1 \cdot \underline{I}_2, \underline{R}_1 \cdot \underline{R}_2\}$ is used to update the gain value $\underline{\mu}$ where MIN is a minimum function, $\underline{I}_1$ is an older imaginary component sign of the older value of $\underline{G}$, $\underline{I}_2$ is a newer imaginary component sign of $\underline{G}$, $\underline{R}_1$ is an older real component sign of the older value of $\underline{G}$, $\underline{R}_2$ is a newer real component sign of $\underline{G}$.

23. The method of claim 22 wherein the new $\underline{\mu}$ value is $\underline{\mu}_{new} = \underline{I} + \alpha \cdot \underline{S}) \underline{\mu}_{old}$ where $\alpha$ is a gain value, and $\underline{\mu}_{old}$ is an older $\underline{\mu}$ value from a pervious iteration.

24. The method of claim 23 wherein the $\underline{\mu}_{new}$ value is limited by an upper limit $\underline{\mu}_{max}$ and a lower limit $\underline{\mu}_{min}$.

25. The method of claim 17 wherein the receive signal is transmitted over a channel line having a line or loop length wherein the step of changing the adaptive filter coefficients converges on a final set of optimal filter coefficients, independently of the line or loop length and at similar convergence rates.

26. A method for training a receiver, the method comprising the steps of:
   (a) receiving a receive signal;
   (b) normalizing the receive signal to obtain a normalized receive signal;
   (c) updating a gain value as a function of an error signal and the normalized receive signal;
   (d) using the gain value to adjust adaptive filter coefficients within the receiver, wherein using the gain value further comprises:

changing the filter coefficients $\underline{W}$ by iteratively updating the adaptive filter coefficients by the relationship:

$$\underline{W}_{new} = \underline{W}_{old} + \underline{\mu} \cdot \underline{G}$$

where $W_{new}$ represents new adaptive filter coefficients, $W_{old}$ represents previously calculated adaptive filter coefficients, $\underline{\mu}$ represents the gain value, and $\underline{G}$ is a vector related to the normalized receive signal $\underline{Y}$; and (e) repeating steps (a)–(d) a plurality of times to obtain final filter coefficients for use by the receiver.

27. The method of claim 26 wherein the gain value $\underline{\mu}$ is either a scalar value that changes with each iteration or a vector wherein each component of the vector changes independent of other components in the vector with each iteration of steps (a)–(d).

28. The method of claim 26 wherein the value $\underline{G}$ is the multiplication of a complex conjugate of the receive signal ($\underline{Y}^*$) by an error quantity ($\underline{E}$).

29. The method of claim 28 wherein the gain value $\underline{\mu}$ is updated by using the real and imaginary components of $\underline{G}$.

30. The method of claim 29 wherein the sign of both the real and imaginary components of $\underline{G}$ and an older value of $\underline{G}$ from a previous iteration is used to update the gain value $\underline{\mu}$.

31. The method of claim 30 wherein a quantity $\underline{S} = \text{MIN}\{\underline{I}_1 \cdot \underline{I}_2, \underline{R}_1 \cdot \underline{R}_2\}$ is used to update the gain value $\underline{\mu}$ where MIN is a minimum function, $\underline{I}_1$ is an older imaginary component sign of the older value of $\underline{G}$, $\underline{I}_2$ is a newer imaginary component sign of $\underline{G}$, $\underline{R}_1$ is an older real component sign of the older value of $\underline{G}$, $\underline{R}_2$ is a newer real component sign of $\underline{G}$.

32. The method of claim 31 wherein the new $\underline{\mu}$ value is $\underline{\mu}_{new} = (\underline{I} + \alpha \cdot \underline{S}) \cdot \underline{\mu}_{old}$ where $\alpha$ is a gain value, and $\underline{\mu}_{old}$ is an older $\underline{\mu}$ value from a pervious iteration.

33. The method of claim 32 wherein the $\underline{\mu}_{new}$ value is limited by an upper limit $\mu_{max}$ and a lower limit $\mu_{min}$.

34. A method for training a receiver, the method comprising the steps of:

(a) Receiving a time domain receive signal from a communication channel;

(b) finding a maximum absolute value of the time domain receive signal over a specific period of time;

(c) normalizing the time domain receive signal to a normalized receive signal using the value derived from the maximum absolute value of the receive signal;

(d) transforming the time domain receive signal to a frequency domain receive signal;

(e) providing a frequency domain initialization sequence in the receiver;

(f) calculating a frequency domain target impulse response from the frequency domain receive signal, the frequency domain initialization sequence, and adaptive filter coefficients;

(g) transforming the frequency domain target impulse response to a time domain target impulse response;

(h) finding a window of maximum energy in the time domain target impulse response;

(i) transforming the window to a frequency domain window;

(j) finding an error using the frequency domain receive signal, the frequency domain initialization sequence, the frequency domain window, and adaptive filter coefficients;

(k) finding a gradient using the error and the frequency domain receive signal;

(l) updating a step size vector using sign changes of real and imaginary entries in the gradient;

(m) using the step size vector and the gradient to update the adaptive filter coefficients;

(n) transforming the frequency domain of the adaptive filter coefficients to the time domain to create time domain adaptive filter coefficients;

(o) finding a window of maximum energy in the time domain adaptive filter coefficients;

(p) transforming the window to the frequency domain adaptive filter coefficients; and (q) repeating steps (a) through (p) a number of times to obtain final filter coefficients for use by the receiver.

* * * * *